United States Patent [19]

Nakaji

[11] Patent Number: 4,654,526
[45] Date of Patent: Mar. 31, 1987

[54] SYSTEM FOR PREVENTION OF CONTACT BETWEEN ANALYZING HEAD AND TRANSPARENT DRUM OF COLOR SCANNER

[75] Inventor: Etsuo Nakaji, Shiga, Japan

[73] Assignee: Dainippon Screen Mfg. Co., Ltd., Kyoto, Japan

[21] Appl. No.: 711,376

[22] Filed: Mar. 13, 1985

[30] Foreign Application Priority Data

Mar. 16, 1984 [JP] Japan .................. 59-51535

[51] Int. Cl.⁴ .................. H01J 3/14; H04N 1/04
[52] U.S. Cl. .................. 250/234; 250/561; 358/285; 358/289
[58] Field of Search .................. 250/234, 561; 358/285, 358/289

[56] References Cited

U.S. PATENT DOCUMENTS 3,764,741 10/1973 Long .................. 358/285
4,580,172 4/1986 Rajasopal .................. 358/285

FOREIGN PATENT DOCUMENTS 0062776 9/1985 Japan .................. 358/285

Primary Examiner—David C. Nelms
Assistant Examiner—Crystal D. Cooper
Attorney, Agent, or Firm—Brumbaugh, Graves, Donohue & Raymond

[57] ABSTRACT

A system for preventing contact between an analyzing head and a transparent drum in a color scanner includes a drum reader for identifying which one of several transparent drums is installed on the scanner, and a head position reader for identifying the selected position of the analyzing head in a direction at right angles to a subscanning direction. The system further includes decision means for deciding whether the position of the analyzing head is suitable for the installed drum, and means for inhibiting movement of the analyzing head in the subscanning direction if the decision means determines that the position of the analyzing head is incompatible with the installed drum.

6 Claims, 11 Drawing Figures

SYSTEM FOR PREVENTION OF CONTACT BETWEEN ANALYZING HEAD AND TRANSPARENT DRUM OF COLOR SCANNER

BACKGROUND OF THE INVENTION

1. Field of the Invention

The present invention relates to a system for the prevention of contact between the analyzing head and transparent drum of a color scanner of the rotary drum scanning type, especially a color scanner which is selectively adapted with transparent drums of different diameters for differing scales of the reproduction.

2. Description of the Prior Art

A scanner system for a color scanner of the above-mentioned type is essentially provided with a transparent drum, an analyzing head, a main scanning driver, and a subscanning driver. The transparent drum is made from a colorless transparent material and the color original is held thereon. The drum is rotatable in a main scanning direction by the main scanning driver. The analyzing head is movable relative to the transparent drum by the subscanning driver. The subscanning direction is transverse to the direction of rotation of the transparent drum. A threaded shaft or screw may be used to couple the subscanning driver to the analyzing head. In such a color scanner, a plurality of transparent drums having different diameters are provided. One of them is chosen for use in the color scanner in accordance with the desired reproduction scale.

The reproduction scale required for such a color scanner extends from 50% to 1600%, and each transparent drum is used to cover from a half scale to a double scale of its standard scale. For example, if four transparent drums having 100%, 200%, 400% and 800% standard scales respectively are prepared for reproduction, it is possible to cover the full range of desired scales by respectively giving them ranges of reproductive scales overlapping with each other, i.e., from 50% to 200% reproductive scales for the drum having a 100% standard scale, from 100% to 400% reproductive scales for the drum having a 200% standard scale, from 200% to 800% reproductive scales for the drum having a 400% standard scale, and from 400% to 1600% reproductive scales for the drum having a 800% standard scale.

The four standard scales described above are generally obtained by choosing the ratio of drum diameters among the four different drums to be R, R/2, R/4 and R/8, in inverse proportion to their standard scales.

The analyzing head is comprised of a light-emitting device and color detector which are assembled in a body and mounted on a carrier. The light-emitting device and color detector are moved in a direction generally perpendicular to the cylindrical surface of the transparent drum in order to suit the different diameters of the various transparent drums which may be used in the color scanner. The light-emitting device and color scanner are positioned at one of a predetermined number of positions.

The subscanning drive system for moving the analyzing head along the length of the transparent drum is usually comprised of a threaded shaft or screw to which the carrier is connected by a pair of half-nuts provided at the side of the carrier. The carrier is movably mounted on a pair of rails so that the analyzing head may be moved smoothly at a predetermined speed on the rails for scanning.

In a scanner of the rotary drum scanning type, transparent drums of differing diameters are used, one at a time. To change drums, the analyzing head may be moved to one side by its driving motor, and one transparent drum may be changed for another. The operator is required to adjust the position of the analyzing head to one of the predetermined positions previously mentioned. However, the operator sometimes forgets to make such an adjustment. In this situation, the analyzing head may possibly contact the transparent drum, with a catastrophic effect on the scanner, which requires very high accuracy. For the prevention of such an accident, the operator has to take such prudent care that the operating efficiency of the scanner as a whole is impaired.

SUMMARY OF THE INVENTION

The present invention is intended to propose a novel system for the prevention of contact between the analyzing head and transparent drum in a color scanner, and to improve the operating efficiency of the scanner as a whole by making it unnecessary for the operator to use great care in changing the position of the analyzing head.

To this end, the present invention provides a system for the prevention of contact of the analyzing head with the transparent drum in a color scanner of the type provided with a plurality of transparent drums having differing diameters in accordance with the reproduction scales or the scales of the color originals, wherein one of the drums at a time is selectively adapted for use in said scanner, an analyzing head whose position against the selected drum is selectively determined to suit said drum, a carrier to carry the analyzing head in its selected position, and driving means to drive the carrier in the direction of the subscanning. The system is comprised of a drum reader located in the neighborhood of the flange of the drum selectively installed on the scanner for identification of that drum, a head position reader disposed at a position corresponding to the predetermined relative positions between the carrier and analyzing head for identification of the position of the analyzing head, a decision means for deciding the suitability of the position of the analyzing head with respect to the drum by comparison of signals from the drum reader and the head position reader, and means for inhibiting the motion of the analyzing head toward the drum when the decision means detects an unsuitable situation, so as to prevent the contact of the analyzing head with the drum.

BRIEF DESCRIPTION OF THE DRAWINGS

The present invention may be understood more clearly and precisely upon reading the following detailed description of the invention, which refers to the attached drawings, wherein like members or parts are designated with the same reference numeral, and wherein.

DETAILED DESCRIPTION OF THE PREFERRED EMBODIMENTS

Figure 3:
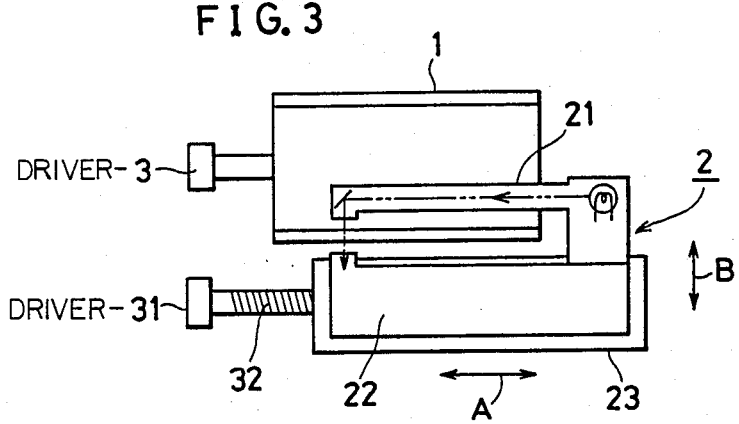
FIG. 3 is a simplified illustration of the construction of a color scanner of the type used in connection with the present invention.

It is useful at this time to review once again the components and features generally found in a color scanner of the type described in the background portion of the specification. Such a color scanner includes a scanner system of the type shown in FIG. 3, wherein a transparent drum 1, rotatable in a main scanning direction, is made from a colorless transparent material and holds the color original thereon. An analyzing head 2 is movable relative to the drum 1 in a subscanning direction designated by arrow A. Main scanning driver 3 drives drum 1 in the main scanning direction, and subscanning driver 31 drives analyzing head 2 in the subscanning direction by rotating screwed shaft 32.

Figure 1:
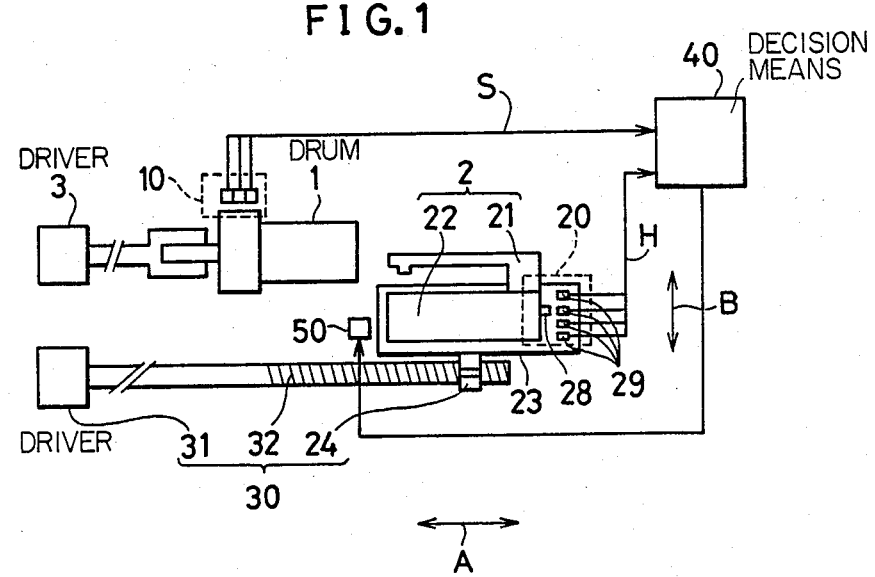
FIG. 1 is a schematic plane view of the scanning system of the color scanner according to the present invention.
Figure 2:
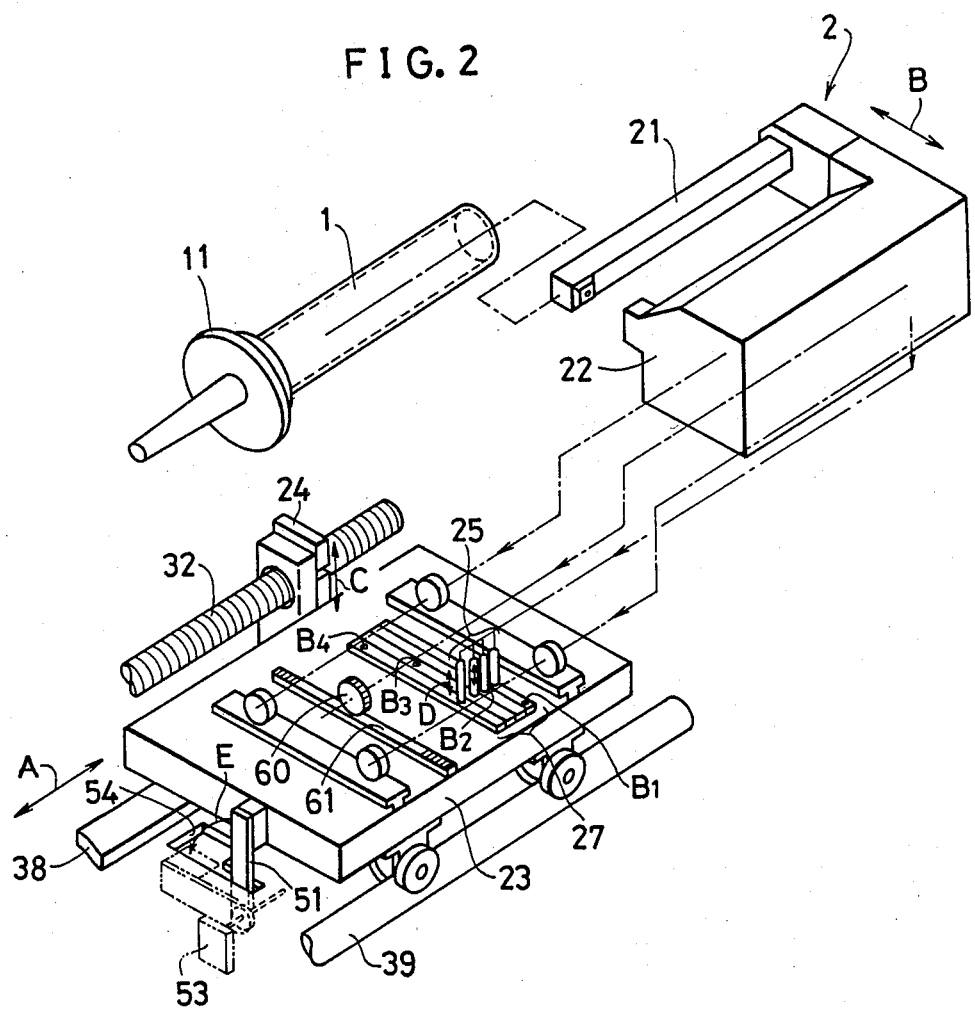
FIG. 2 is a schematic perspective view of the scanning system of the color scanner according to the present invention.

The analyzing head is comprised of a light-emitting device 21 and a color detector 22, both of which are mounted on a carrier 23. The light-emitting device 21 and the color detector 22 are assembled in a body, and moved on the carrier 23 in the direction designated by arrow B in FIGS. 1 to 3 to suit with the various diameters of the transparent drums 1 which may be installed. As shown in FIG. 2, light-emitting device 21 and color detector 22 are easily positioned at a selected position among predetermined positions B1, B2, B3, B4 by means of detent members 25, 27.

In order to move analyzing head 2 in a lateral direction (shown by arrow A) along the length of the transparent drum 1, a subscanning drive system 30 of the screw driving type is provided, which is usually comprised of a subscanning driver 31 and a screwed shaft 32. Shaft 32 is connected at one end to subscanning driver 31 by a decelerating device (not shown). Carrier 23 is connected to screwed shaft 32 by a pair of half-nuts 24 provided at the side of carrier 32. Carrier 23 is movably mounted on a pair of rails 38, 39 as shown in FIG. 2, so that analyzing head 2 may be moved smoothly at the predetermined speed for scanning.

There are two methods by which half-nuts 24 of carrier 23 may be connected to screwed shaft 32. In one method, nuts 24 are appropriately separated in the direction shown by arrow C when a lever or the like is operated to release their hold or grip upon screwed shaft 32. In another method, nuts 24 retain their grip upon screwed shaft 32 except in particular instances (for example, maintenance).

In the former method, carrier 23, and therefore, analyzing head 2, are manually movable in the right and left directions (shown by the arrow A in FIG. 2). Thus, one transparent drum 1 may be substituted for another after carrier 23 and analyzing head 2 have been moved toward the right. Thereafter, analyzing head 2 may be properly positioned by moving it along carrier 23 in the direction of arrow B to suit the newly installed drum 1. Then, after analyzing head 2 is roughly arranged at the starting point of scanning, half-nuts 24 are tightened to fit on screwed shaft 32.

The latter method is preferred for a color scanner controlled by a micro-computer. On the occasion of an exchange of transparent drums 1 when using this method, analyzing head 2 may be moved right by driving motor 31 by operating a service switch mentioned below (see switch 41 in FIG. 7, and switch 41a in FIG. 9), without releasing the grip of half-nuts 24 on screwed shaft 32. Then, the transparent drum 1 may be exchanged for another one.

Figure 4:
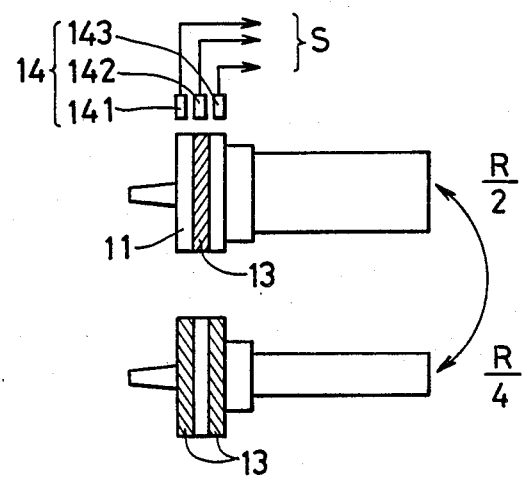
FIG. 4 is a plane view of the drum reader according to a preferred embodiment of the present invention.

The explanation of the drum reader for identification of transparent drums may now be described. FIG. 4 shows a preferred embodiment of a drum reader 10, wherein a detector 14, having three photo sensors 141, 142 and 143 of the reflection type, is provided to detect identification marks 13 disposed on (each) transparent drum 1 at the periphery of its flange 11. Photo sensors 141, 142, 143 are each provided with a light-emitting component and a photo detector. By way of example, the installed transparent drum 1 may be identified as the one used for 8× (i.e., eight times) enlargement when only the left sensor 141 is ON, for 4× enlargement when only the central sensor 142 is ON, for 2× enlargement when both sensors 141 and 143 are ON, and for 1× or full size reproduction when only the right sensor 143 is ON. No drum is identified as installed when sensors 141, 142 and 143 are OFF.

Figure 5:
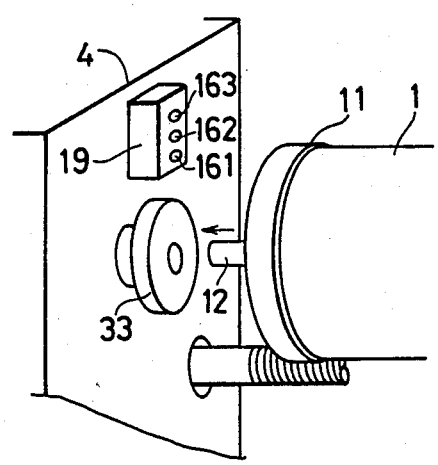
FIG. 5 is a perspective view of the drum reader according to another preferred embodiment of the present invention.

FIG. 5 shows another preferred embodiment of drum reader 10, wherein numeral 19 designates a detector having three photo sensors 161, 162 and 163 of the reflection type. Each of the sensors 161, 162 and 163 is disposed against the end surface of flange 11 of transparent drum 1 when it is regularly installed, and each is aligned in the direction of a radius of the drum 1 so that each of them will work or not in correspondence to the size of transparent drum 1 installed. Each transparent drum 1 has a circular identification mark which corresponds to the size of the drum at flange 11. Alternatively, it is possible to have photo sensors 161, 162 and 163 detect the size of the installed drum 1 directly.

Numeral 33 in FIG. 5 designates a device that checks for the installation of a transparent drum 1, and it operates by fitting therein the installation shaft 12 of the drum 1, which protrudes from the end surface of the flange 11.

The head position reader 20, which identifies the selected position of analyzing head 2 on carrier 23, will now be described. As shown in FIG. 1, a magnetic piece 28 may be fixed on analyzing head 2 at a selected point as the object to be detected (without relation to the positioning pins 25), and magnetic sensors 29 individually operated by the magnetic force produced by piece 28 may be disposed on carrier 23 at suitable positions corresponding to the diameters of transparent drums 1. This arrangement helps assure that reader 20 is free from malfunction caused by optical disturbance. Also, it allows the location of head position reader 20 to be freely selected.

Figure 6:
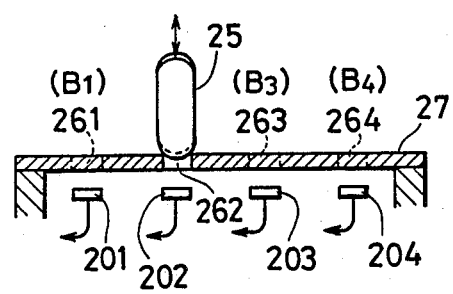
FIG. 6 is a schematic sectional view of a head position reader according to a preferred embodiment of the present invention.

As shown in FIGS. 2 and 6, the detent means of analyzing head 2 comprises a plurality of pins 25 disposed at the bottom of color detector 22, and a plurality of receiving members 27 fixed on carrier 23 corresponding to these pins. Each pin 25 is normally and individually biased into contact with the top surface of the corresponding receiving member 27 by a spring means not shown. Each receiving member 27 is provided with a detent bore 261, 262, 263 or 264 corresponding to one of the predetermined positions B1, B2, B3 or B4, in which the bottom end of corresponding pin 25 is allowed to fit in, so that the detent means functions as a click stop.

Head position reader 20 is provided with photo sensors 201, 202, 203, and 204 under bores 261, 262, 263 and 264, respectively, opposite the bottom surface of pin 25. Each of these photo sensors 201 through 204 detects the fitting of corresponding pin 25 in its bore.

The likelihood of malfunction in head position reader 20 in the above-mentioned embodiment is beneficially reduced due to the location of pins 25 and photo sensors 201 through 204 at the bottom of the color sensor 22, since it is difficult for external light to reach them.

Analyzing head 2 may be positioned relative to carrier 23 by means of a pulse motor (not shown) mounted on analyzing head 2 for driving head 2 in the direction designated by arrow B, a pinion 60 engaged to the pulse motor, and a rack 61 fixed on carrier 23. In this arrangement, it is advantageous to automatically select and control the position of analyzing head 2 by actuating the pulse motor in accordance with a signal S from drum reader 10 whenever transparent drum 1 is exchanged or installed.

Figure 7:
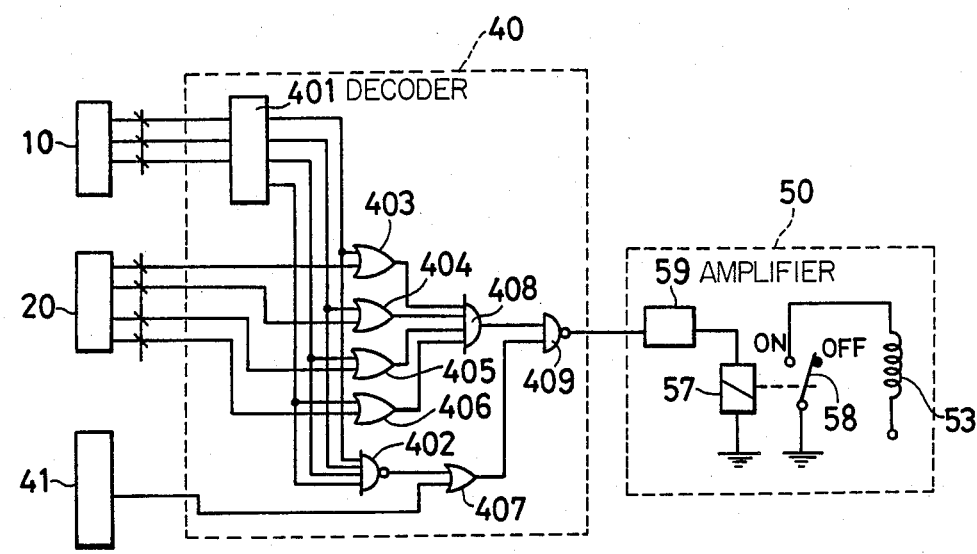
FIG. 7 is a block diagram of an electric circuit for driving the system of the present invention.

An explanation of decision means 40 and stopper means 50 (see FIG. 1) for inhibiting the motion of the analyzing head 2 in the direction of subscanning (shown by arrow A) will now be given. Reference will be made to FIG. 7, which shows a circuit diagram of a driving circuit for driving stopper means 50.

An exemplary stopper means 50 shown in FIG. 2 includes a stopper 51 and a rotary solenoid 53. Stopper 51 in its normal or standing position protrudes above the base frame through a cut-out 54 on account of a coil spring (not shown) associated in rotary solenoid 53. In this position, stopper 51 inhibits the motion of analyzing head 2 in the subscanning direction. Stopper 51 is rotated in the direction shown by arrow E so that it falls through the cut-out in the base frame when rotary solenoid 53 receives a signal from decision means 40. This occurs when decision means 40 recognizes that the size of transparent drum 1 installed and the selected position of the analyzing head 2 agree, i.e., are suited for one another.

Decision means 40 is comprised of decoder 401, four input NAND circuit 402, OR circuits 403 through 406, OR circuit 407, four input AND circuit 408, NAND circuit 409, and service switch 41, electrically connected as shown in FIG. 7.

The identification signals S sent from drum reader 10 are decoded by decoder 401 into a four bit signal representing four binary digits or variables. Each digit when at its '0' level represents a different size of drum 1. Therefore, whenever the signal from decoder 401 has one digit at the '0' level and three digits at the '1' level, one of the transparent drums 1 is installed. When all digits are at the '1' level, no transparent drum 1 is installed.

The identification signals H from head position reader 20 also constitute a four bit signal. Each bit or digit (when at the '0' level) corresponds to and signifies that analyzing head 2 is at one of the four different predetermined positions for the analyzing head. Therefore, when signal H is comprised of one digit at the '0' level and three digits of '1' level, analyzing head 2 is positioned at the corresponding selected position among the positions B1–B4, whereas when all digits are at the '1' level, analyzing head 2 is off of the positions B1–B4.

When the location of analyzing head 2 correctly corresponds to the size of the installed transparent drum 1, the output of AND circuit 408 is at the '0' level. Accordingly, the output of final NAND circuit 409 is at the '1' level, enabling or energizing relay 57 via amplifier (or converter) 59, which closes contact 58, so as to excite solenoid 53. This rotates stopper 51 in the direction designated by arrow E, causing it to fall through cut-out 54 and down into the base frame. The inhibition of the motion of analyzing head 2 is thus cancelled, which allows head 2 to move toward the left (as viewed in FIGS. 1–3).

When analyzing head 2 is not positioned at the correct position corresponding to the size of transparent drum 1, solenoid 53 will not be energized, and stopper 51 will protrude through the base frame due to the coil spring disposed in solenoid 53 as mentioned above, so as to obstruct the motion of carrier 23 toward the left.

Service switch 41 is provided so that the obstruction of carrier motion by stopper 51 may be cancelled during maintenance operations. When maintenance is required, service switch 41 is operated and it produces a '0' level. This causes OR circuit 407 to produce a '0' level output. This causes stopper 51 to fall into the base frame when none of the transparent drums 1 are installed in the color scanner. But when any one of the drums 1 is installed in the color scanner, stopper 51 will not fall, no matter what the value of the signal from service switch 41, if the drum size indicated by signal does not correctly correspond to the head position indicated by signal H.

Figure 8A:
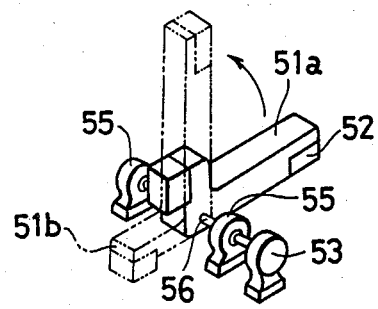
FIGS. 8A and 8B are perspective views of two means for inhibiting the motion of the analyzing head according to alternative preferred embodiments of the present invention.
Figure 8B:
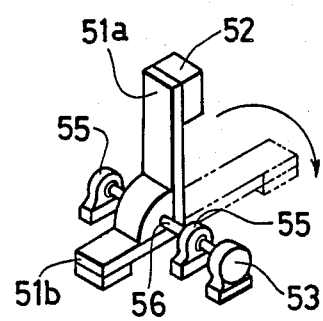

FIG. 8 shows two different modified embodiments of stopper 51, each of which are L-shaped. Each of the stoppers shown in FIG. 8A and FIG. 8B is provided with a first buffer member 52 on longer arm 51a for receiving carrier 23 of analyzing head 2, and a second buffer member at shorter arm 51b for propping stopper 51 against the base frame when obstructing the movement of carrier 23. Each stopper 51 shown in FIG. 8 is also fixed to a rotary shaft 56 supported by bearings 55.

Figure 9:
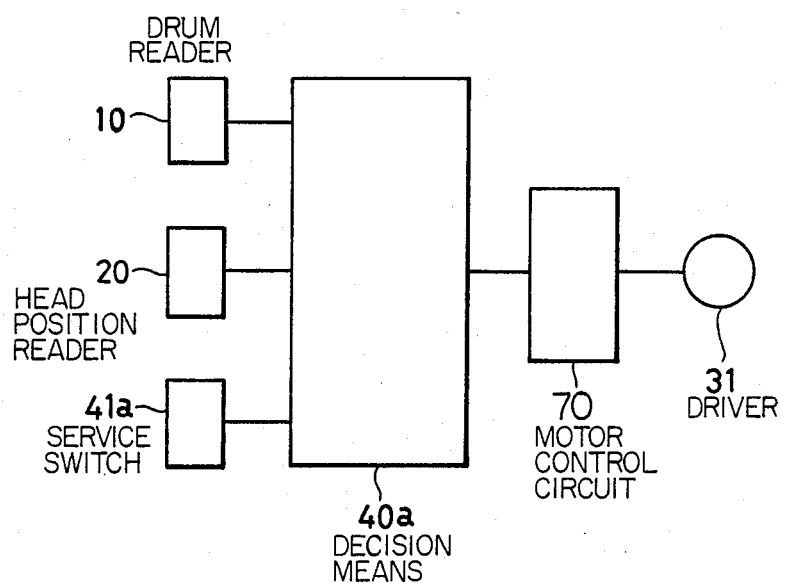
FIG. 9 is a block diagram of means for inhibiting the motion of the analyzing head according to another preferred embodiment of the present invention.

An explanation will now be given about the color scanner embodiment mentioned above wherein the engagement of half-nuts 24 and screwed shaft 32 is normally not released. FIG. 9 shows a block diagram according to a preferred embodiment of this type. Decision means 40a (which corresponds to decision means 40 in FIG. 7) is comprised of a micro-computer, and means 50 for inhibiting the motion of analyzing head 2 is comprised with a motor control circuit 70, which controls driving motor 31 (instead of amplifier or converter 59, relay 58, contact 57, and rotary solenoid 53). The service switch 41a is arranged to switch between right, neutral, and left positions.

In a scanner of this type, half-nuts 24 are normally kept engaged with screwed shaft 32 as mentioned above, so analyzing head 2 cannot be manually moved to the right or left (shown by arrow A) by pushing upon it or carrier 23. Instead, an inhibiting program for inhibiting the movement of head 2 and carrier 23 may be interposed in front of the driving program used to drive analyzing head 2 in order to prevent the contact of analyzing head 2 with transparent drum 1.

Figure 10:
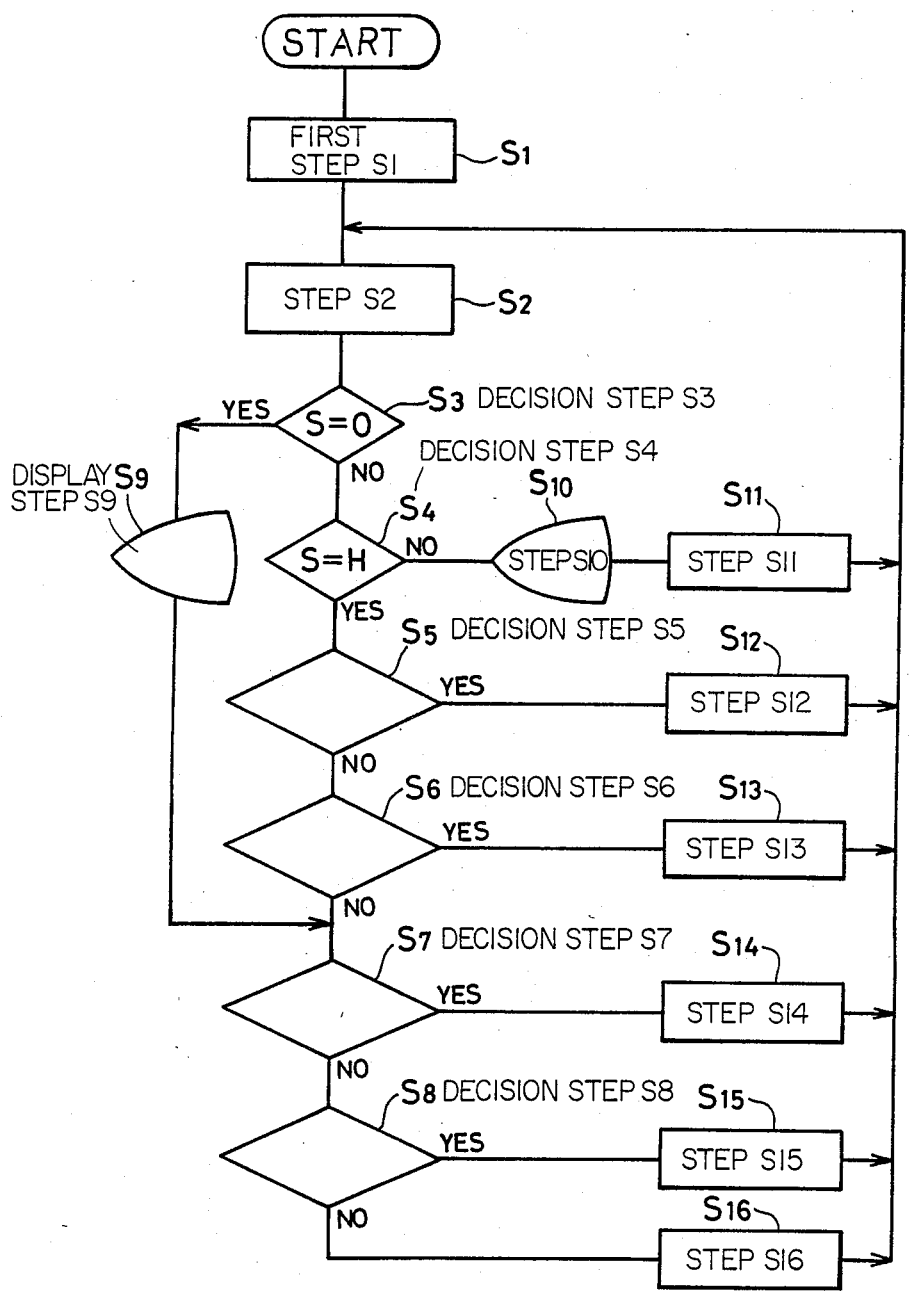
FIG. 10 is a flow chart of the program practiced in the decision means.

The flow of the aforementioned program for decision means 40a is shown in FIG. 10. At the first step S1, subscanning driver 31 is stopped. Then, data are input to the computer at step S2. The symbol S designates the identification signal of the transparent drum 1, and the symbol H designates the identification signal of the position of analyzing head 2. In addition to inputting signals S and H, a normal operation signal of the scanner and a subscanning drive command, which is conveniently provided by the operator, are also input together at step S2.

At decision step S3, if a transparent drum is not installed, S equals '0', and the acknowledgment is 'YES'. Thus, the procedure goes to the display step S9, where lack of the drum is displayed, and then to the decision step S7.

At step S3, if one of the transparent drums was installed, the acknowledgment is 'NO', and the procedure advances to the next decision step S4.

At decision step 4, the acknowledgment is 'NO' when the position of the analyzing head is not suitable for the drum which is installed. In this case, procedure goes to step S10, where the unsuitability of the drum and the position of the analyzing head is displayed, and then to step S11, where driver 31 is stopped. After that, the procedure returns to step S2.

At step S4, the acknowledgment is 'YES' when the position of the analyzing head suits the drum installed, and the procedure advances to decision step S5.

At decision step S5, if the normal operation signal represents motion to the right, the acknowledgment is 'YES'. Thus, driver 31 is actuated to drive the analyzing head toward the right at the following step, step S12. If the normal operation signal did not represent the foregoing, the acknowledgment is 'NO', and the procedure advances to decision step S6.

At decision step S6, if the normal operation signal of scanner represents motion to the left, the acknowledgment is 'YES', and the driver is actuated to drive the analyzing head to the left. If the normal operation signal did not represent the foregoing, the acknowledgment is 'NO', and the procedure goes to decision step S7.

At decision step S7, if the command for motion to the right was given by the operator operating service switch 41a, the acknowledgment is 'YES', and the driver is actuated at following step S14, as well as at step S12. If the command given by the operator was not so, the acknowledgment is 'NO', and the procedure proceeds to final decision step S8.

At decision step S8, if the command given by the operator was for motion to the left, the acknowledgment is 'YES', and the driver is actuated at the following step, step S15, as well as at step S13. If the command given by the operator was not so, the acknowledgment is 'NO', and the driver is stopped at following step, step S16.

The steps S14 and S15 are each programmed to continue from the first decision step S3 via display step S9 and decision steps S7 and S8, respectively, in order to move the analyzing head in response to the command from the operator when no transparent drum is installed.

This procedure normally proceeds along the same flow path to maintain actuation of the driver. When a new command is given, new data is read in at step S2, and the flow of the procedure from decision step S4 to decision step S8 is modified to control the driver in accordance with the new command.

The foregoing explanation has been given with respect to the case where decision means 40a is comprised of a micro-computer, but it should not be limited to this case. Decision means 40a may, for example, be comprised of a relay circuit involving a large number of relays mutually associated with one another in the usual manner.

Moreover, the positioning of analyzing head 2 upon support 23 may be realized using a pulse motor (not shown) mounted on analyzing head 2, a pinion 60 engaged to the pulse motor, and rack 61 fixed on support 23 for driving support 23 in the direction of arrow B. In this case, it is more advantageous to automatically select and control the position of analyzing head 2 by driving the pulse motor, whenever a transparent drum is installed, in accordance with the signal S sent from the drum reader 10.

As mentioned above, in the system according to the present invention, the absence of, or the installation and size of, the transparent drums is positively identified by means of drum reader 10. Also, the suitability of the position of analyzing head 2 with respect to the drum is determined by decision means 40, 40a according to the identification of the drum and the position of the analyzing head, which is identified by head position reader 20. Where the position of analyzing head 2 is not suitable for the drum 1, decision means actuates contact prevention means 50, so as to positively prevent contact between the analyzing head 2 and the drum 1 even when the operator has made a mistake in selecting the position of analyzing head 2. Accordingly, accidental contact of the analyzing head with the transparent drum will be prevented.

From the foregoing, it may seem that the system according to the present invention greatly contributes to safe operation of a color scanner by its operator, and improves the efficiency with which the color scanner may be operated.

I claim:

1. A system for the prevention of contact of an analyzing head with a transparent drum in a color scanner provided with a plurality of transparent drums having different diameters, wherein one of the drums is selectively adapted for use with said scanner, an analyzing head positioned selectively against said drum to suit said drum, a carrier for carrying said analyzing head at one of a plurality of selected positions in a direction at right angles to a subscanning direction, and driving means for driving said carrier in the subscanning direction, wherein said system comprises:

drum reader means for identifying said drum adapted on said scanner and producing a corresponding drum identification signal;

head position reader means, disposed between said carrier and said analyzing head, for identifying the position of said analyzing head and producing a corresponding head position signal;

decision means for determining the suitability of the position of said analyzing head with respect to said drum adapted by comparing drum identification and head position signals; and means for inhibiting the movement of said analyzing head in the subscanning direction when said decision means determines the compared signals are incompatible.

2. A system as recited in claim 1, wherein said transparent drums are each provided with a flange, and said drum reader means includes identification marks formed on the periphery of flange of said transparent drum, and photo sensors disposed adjacent to said identification marks.

3. A system as recited in claim 1, wherein said drum reader means includes a plurality of photo sensors disposed adjacent to the end surface of the side of said drum installed deepest within the color scanner for identifying the radius of the drum at said side.

4. A system as recited in claim 1, wherein said head position reader means includes:
a plurality of detectors disposed on said carrier at positions selected to correspond with the selected positions at which said carrier may carry said analyzing head, and
detent means for selectively determining the position of said analyzing head on said carrier, and for selectively actuating one of said detectors when said analyzing head is one of said selected positions.

5. A system as recited in claim 1, wherein said color scanner is further provided with a base frame, and wherein said means for inhibiting the movement of said analyzing head in the subscanning direction includes a rotary solenoid, and a stopper movable by said solenoid between a first position wherein it protrudes from the base frame, and a second position wherein it retracts into the base frame.

6. A system as recited in claim 1, wherein said means for inhibiting the movement of said analyzing head in the subscanning direction includes a relay actuated by an output signal from said decision means, and a contact of said relay interposed in the driving circuit for said driving means.

* * * * *